United States Patent
Agapie et al.

(10) Patent No.: US 12,281,190 B2
(45) Date of Patent: Apr. 22, 2025

(54) BIS(PHOSPHINO)-PHENOXY NICKEL(II) CATALYSTS FOR THE COPOLYMERIZATION OF ETHYLENE AND ACRYLATE MONOMERS

(71) Applicants: Dow Global Technologies LLC, Midland, MI (US); California Institute of Technology, Pasadena, CA (US)

(72) Inventors: Theodor Agapie, Pasadena, CA (US); Shuoyan Xiong, Pasadena, CA (US); Brad C. Bailey, Midland, MI (US); Heather A. Spinney, Midland, MI (US); Alex J. Nett, Midland, MI (US); David R. Wilson, Midland, MI (US); Jerzy Klosin, Midland, MI (US)

(73) Assignees: Dow Global Technologies LLC, Midland, MI (US); California Institute of Technology, Pasadena, CA (US)

( * ) Notice: Subject to any disclaimer, the term of this patent is extended or adjusted under 35 U.S.C. 154(b) by 561 days.

(21) Appl. No.: 17/636,048

(22) PCT Filed: Aug. 18, 2020

(86) PCT No.: PCT/US2020/046767
§ 371 (c)(1),
(2) Date: Feb. 17, 2022

(87) PCT Pub. No.: WO2021/034809
PCT Pub. Date: Feb. 25, 2021

(65) Prior Publication Data
US 2022/0332858 A1 Oct. 20, 2022

Related U.S. Application Data

(60) Provisional application No. 62/889,249, filed on Aug. 20, 2019.

(51) Int. Cl.
C08F 4/80 (2006.01)
B01J 31/24 (2006.01)
C08F 4/70 (2006.01)
C08F 210/02 (2006.01)

(52) U.S. Cl.
CPC ......... *C08F 4/7031* (2013.01); *B01J 31/2409* (2013.01); *C08F 4/80* (2013.01); *C08F 210/02* (2013.01)

(58) Field of Classification Search
None
See application file for complete search history.

(56) References Cited

U.S. PATENT DOCUMENTS 8,618,319 B2 12/2013 Shimizu et al.
2017/0306134 A1 10/2017 Hattori et al.

FOREIGN PATENT DOCUMENTS

JP 5812764 B2 3/2013
JP 2018024646 A 2/2018
WO WO-2014205025 A1 * 12/2014 .......... B01J 31/2404

OTHER PUBLICATIONS

Beganskiene, A., Nikishkin, N. I., Luck, R. L., Urnezius, E. "Syntheses of Symmetric and Unsymmetric 2,6-Bis(phosphino)phenols". Heteroatom Chemistry 2006, 17(7), 656-663. (Year: 2006).*
Beganskiene, A., Kongprakaiwoot, N., Luck, R. L., Urnezius, E. "Synthesis of 2,6-Bis(bis(2-(methylthio)phenyl)phosphino)-4-methylphenol, a Novel Polydentate Ligand Containing Two Tripodal [S,S,P,O] Coordination . . . ". Zeitschrift fuer Anorganische und Allgemeine Chemie 2006, 632(10-11), 1879-1884. (Year: 2006).*
Beganskiene et al. "Synthesis of 2,6-Bis(bis(2-(methylthio)phenyl)phesphino)-4-methylphenol, a Novel Polydentate Ligand Containing Two Tripodal [S,S,P,O] Coordination Pockets; Crystal Structure of the Dimeric Thallium(1) Complex" Z. Anorg. Allg. Chem. 2006, 632, 1879-1884, 6 pgs.
Heinicke et al. "2-Dialkyl- and 2-tert-Butylphenylphosphinophenol(ate) Nickel and Palladium Complexes: Control of E/Z-Configuration in Bis(PO-chelates) and Activation of the Nickel Complexes for Polymerization of Ethylene" Z. Anorg. Allg. Chem. 2004, 630, 1181-1190, 10 pgs.
Heinicke et al. "Tuning of nickel 2-phosphinophenolates—catalysts for oligomerization and polymerization of ethylene" Journal of Organometallic Chemistry 690 (2005) 2449-2457, 9 pgs.
International Search Report and Written Opinion dated Nov. 5, 2020, pertaining to Int'l Patent Application No. PCT/US2020/046767.
Xin et al. "Nickel Catalyzed Copolymerization of Ethylene and Alkyl Acrylates" J. Am. Chem. Soc. 2017, 139, 3611-3614, 4 pgs.
Tran et al. "Development of highly productive nickel-sodium phenoxyphosphine ethylene polymerization catalysts and their reaction temperature profiles" Polym. Chem. 2019, 10, 3718-3721, 4 pgs.
Chinese Office Action dated Sep. 28, 2023, pertaining to CN Patent Application No. 202080056858.3, 16 pgs.
Zhang et al. "Robust Bulky [P,O] Neutral Nickel Catalysts for Copolymerization of Ethylene with Polar Vinyl Monomers," ACS Catal., May 21, 2018, pp. 5963-5976.

(Continued)

*Primary Examiner* — Richard A. Huhn
(74) *Attorney, Agent, or Firm* — Dinsmore & Shohl LLP

(57) ABSTRACT

Processes of polymerizing olefin monomers using catalyst systems and catalysts systems that include a procatalyst having a structure according to formula (I): (I).

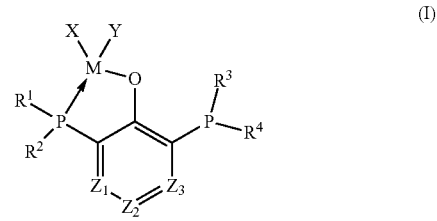

18 Claims, No Drawings

(56) References Cited

OTHER PUBLICATIONS

Japanese Office Action dated Jun. 18, 2024, pertaining to JP Patent Application No. 2022-508841, 10 pgs.
Chinese Office Action dated Apr. 24, 2024, pertaining to CN Patent Application No. 202080056858.3, 18 pgs.
Brazil Office Action dated Oct. 30, 2024, pertaining to BR Patent Application No. 112022002679.0, 5 pgs.
Japanese Office Action dated Nov. 19, 2024, pertaining to JP Patent Application No. 2022-508841, 4 pgs.

* cited by examiner

BIS(PHOSPHINO)-PHENOXY NICKEL(II) CATALYSTS FOR THE COPOLYMERIZATION OF ETHYLENE AND ACRYLATE MONOMERS

CROSS-REFERENCE TO RELATED APPLICATIONS

This application is a National Stage Entry under 35 U.S.C. § 371 of International Patent Application No. PCT/US2020/046767, filed Aug. 18, 2020, which claims priority to U.S. Provisional Patent Application No. 62/889,249, filed on Aug. 20, 2019, the entire disclosures of both of which are hereby incorporated by reference.

TECHNICAL FIELD

Embodiments of the present disclosure generally relate to ethylene and acrylate polymerization catalyst systems and processes, and, more specifically, to the ethylene and acrylate polymerization catalyst systems including bis(phosphino)-phenoxy nickel(II) complexes and to olefin polymerization processes incorporating these catalyst systems.

BACKGROUND

Ethylene/acrylate copolymers are formed through high pressure and/or high temperature radical processes and have a highly branched microstructure similar to that of low density polyethylene (LDPE). Coordination catalysis provides a route to highly linear ethylene/acrylate copolymers, similar to linear low-density polyethylene (LLDPE). These linear copolymers exhibit higher crystallinity and higher thermal resistance than the incumbent materials formed through the radical processes. Unfortunately, most organometallic coordination catalysts are not compatible with acrylic acid or acrylates.

The Group IV metal catalysts (Ti, Zr, HO used in the industrial manufacture of LLDPE (ethylene/α-olefin copolymers) are not compatible with polar olefin monomers such as acrylates. The oxygen atoms of the acrylates strongly coordinate to Lewis acidic Group IV metals which blocks the active site of the metal, effectively hindering further olefin polymerization.

Therefore, more electron-rich late metal catalysts containing Group 10 metals (Pd, Ni) are utilized in the copolymerization reactions of ethylene with acrylate monomers. However, many reported Ni— and Pd-containing metal catalysts have a) slow rates of polymerization and/or b) low incorporation of the polar monomers of interest.

SUMMARY

Ongoing needs exist to create a new ligand framework for Ni catalysts that promotes both high rates of ethylene copolymerization activity and high incorporation of the acrylate comonomer. With a new ligand framework for Ni, ethylene and polar monomers may be copolymerized via coordination catalysis to form a highly linear LLDPE-like copolymer. The new, highly linear copolymers are expected to exhibit improved creep resistance and dimensional stability at higher application temperatures.

Embodiments of this disclosure include catalyst systems. The catalyst system includes a procatalyst having a structure according to formula (I):

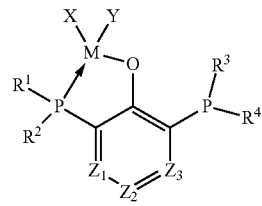

In formula (I), M is nickel(II) or palladium(II); X is a ligand chosen from $(C_1-C_{40})$hydrocarbyl, $(C_1-C_{40})$heterohydrocarbyl, $-CH_2Si(R^C)_{3-Q}(OR^C)_Q$, $-Si(R^C)_{3-Q}(OR^C)_Q$, $-OSi(R^C)_{3-Q}(OR^C)_Q$, $-Ge(R^C)_{3-Q}(OR^C)_Q$, $-P(R^C)_{2-W}(OR^C)_W$, $-P(O)(R^C)_{2-W}(OR^C)_W$, $-N(R^C)_2$, $-NH(R^C)$, $-N(Si(R^C)_3)_2$, $-NR^CSi(R^C)_3$, $-NHSi(R^C)_3$, $-OR^C$, $-SR^C$, $-NO_2$, $-CN$, $-CF_3$, $-OCF_3$, $-S(O)R^C$, $-S(O)_2 R^C$, $-OS(O)_2R^C$, $-N=C(R^C)_2$, $-N=CH(R^C)$, $-N=CH_2$, $-N=P(R^C)_3$, $-OC(O)R^C$, $-C(O)OR^C$, $-N(R^C)C(O)R^C$, $-N(R^C)C(O)H$, $-NHC(O)R^C$, $-C(O)N(R^C)_2$, $-C(O)NHR^C$, $-C(O)NH_2$, a halogen, or a hydrogen, wherein each $R^C$ is independently a substituted or unsubstituted $(C_1-C_{30})$hydrocarbyl, or a substituted or unsubstituted $(C_1-C_{30})$heterohydrocarbyl, and subscript Q is 0, 1, 2 or 3, and subscript W is 0, 1 or 2. Each Y is a Lewis base, wherein X and Y are optionally linked.

In some embodiments, Y is an organic Lewis base.

In formula (I), $Z_1$, $Z_2$, $Z_3$ independently are $C(R^Z)$ or nitrogen, wherein each $R^Z$ is independently substituted $(C_1-C_{30})$hydrocarbyl, unsubstituted $(C_1-C_{30})$hydrocarbyl, substituted $(C_1-C_{30})$heterohydrocarbyl, unsubstituted $(C_1-C_{30})$heterohydrocarbyl, $-CH_2Si(R^C)_{3-Q}(OR^C)_Q$, $-Si(R^C)_{3-Q}(OR^C)_Q$, $-OSi(R^C)_{3-Q}(OR^C)_Q$, $-Ge(R^C)_{3-Q}(OR^C)_Q$, $-P(R^C)_{2-W}(OR^C)_W$, $-P(O)(R^C)_{2-W}(OR^C)_W$, $-N(R^C)_2$, $-NH(R^C)$, $-N(Si(R^C)_3)_2$, $-NR^CSi(R^C)_3$, $-NHSi(R^C)_3$, $-OR^C$, $-SR^C$, $-NO_2$, $-CN$, $-CF_3$, $-OCF_3$, $-S(O)R^C$, $-S(O)_2R^C$, $-OS(O)_2R^C$, $-N=C(R^C)_2$, $-N=CH(R^C)$, $-N=CH_2$, $-N=P(R^C)_3$, $-OC(O)R^C$, $-C(O)OR^C$, $-N(R^C)C(O)R^C$, $-N(R^C)C(O)H$, $-NHC(O)R^C$, $-C(O)N(R^C)_2$, $-C(O)NHR^C$, $-C(O)NH_2$, a halogen, or a hydrogen; in which subscript Q is 0, 1, 2 or 3, subscript W is 0, 1 or 2, and $R^C$ is chosen from $(C_1-C_{18})$hydrocarbyl; provided that at least one of $Z_1$, $Z_2$, and $Z_3$ is $C(R^Z)$.

In formula (I), $R^1$, $R^2$, $R^3$, and $R^4$ are independently selected from the group consisting of $(C_1-C_{50})$hydrocarbyl and $(C_1-C_{50})$heterohydrocarbyl.

In formula (I), when both $Z_1$ and $Z_2$ are $C(R^Z)$, optionally respective groups $R^Z$ are linked to form a ring structure. When both $Z_2$ and $Z_3$ are $C(R^Z)$, optionally respective groups $R^Z$ are linked to form a ring structure. When all of $Z_1$, $Z_2$, and $Z_3$ are $C(R^Z)$, optionally respective groups $R^Z$ are linked to form a multi-ring structure. Optionally, $R^1$ and $R^2$ are linked to form a ring structure; and $R^3$ and $R^4$ are optionally linked to form a ring structure.

Embodiments of this disclosure include a polymerization process. The polymerization process includes polymerizing ethylene and one or more polar monomers in the presence of a catalyst system under olefin polymerization conditions to form a polar ethylene-based copolymer. The catalyst system includes a metal-ligand complex according to formula (I) of this disclosure.

DETAILED DESCRIPTION

Specific embodiments of catalyst systems will now be described. It should be understood that the catalyst systems of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

Common Abbreviations are Listed Below:

$R^C$, $R^Z$, $R^1$, $R^2$, $R^3$, $R^4$, $Z_1$, $Z_2$, $Z_3$, X, Y, Q, and W: as defined above; Me: methyl; Et: ethyl; Ph: phenyl; Bn: benzyl; i-Pr: isopropyl; t-Bu: tert-butyl; t-Oct: tert-octyl (2,4,4-trimethylpentan-2-yl); THF: tetrahydrofuran; $Et_2O$: diethyl ether; $CH_2Cl_2$: dichloromethane; EtOAc: ethyl acetate; $C_6D_6$: deuterated benzene or benzene-$d_6$; $CDCl_3$: deuterated chloroform; $Na_2SO_4$: sodium sulfate; $MgSO_4$: magnesium sulfate; HCl: hydrogen chloride; n-BuLi: butyllithium; t-BuLi: tert-butyllithium; $K_2CO_3$: potassium carbonate; $N_2$: nitrogen gas; PhMe: toluene; PPR: parallel pressure reactor; MAO: methylaluminoxane; MMAO: modified methylaluminoxane; GC: gas chromatography; LC: liquid chromatography; NMR: nuclear magnetic resonance; MS: mass spectrometry; mmol: millimoles; mL: milliliters; M: molar; min or mins: minutes; h or hrs: hours; d: days; Rf: retention factor; TLC; thin-layer chromatography; rpm: revolutions per minute.

The term "independently selected" followed by multiple options is used herein to indicate that individual groups appearing before the term, such as $R^1$, $R^2$, $R^3$, $R^4$, and $R^C$, can be identical or different, without dependency on the identity of any other group also appearing before the term.

The term "procatalyst" refers to a compound that has catalytic activity after activation, for example upon removal of the Lewis base coordinated to the Ni or Pd metal center.

When used to describe certain carbon atom-containing chemical groups, a parenthetical expression having the form "$(C_x-C_y)$" means that the unsubstituted form of the chemical group has from x carbon atoms to y carbon atoms, inclusive of x and y. For example, a $(C_1-C_{50})$alkyl is an alkyl group having from 1 to 50 carbon atoms in its unsubstituted form. In some embodiments and general structures, certain chemical groups may be substituted by one or more substituents such as $R^S$ wherein $R^S$ generically represents any substituent defined in this application. An $R^S$ substituted version of a chemical group defined using the "$(C_x-C_y)$" parenthetical may contain more than y carbon atoms depending on the identity of any groups $R^S$. For example, a "$(C_1-C_{50})$alkyl substituted with exactly one group $R^S$, where $R^S$ is phenyl ($-C_6H_5$)" may contain from 7 to 56 carbon atoms. Thus, in general when a chemical group defined using the "$(C_x-C_y)$" parenthetical is substituted by one or more carbon atom-containing substituents $R^S$, the minimum and maximum total numbers of carbon atoms of the chemical group are determined by adding to both x and y, respectively, the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or functional group is replaced by a substituent (e.g., $R^S$). The prefix "per" has its usual meaning of "thoroughly" or "utterly", for example, the term "persubstitution" or "persubstituted", means that every hydrogen atom (H) bonded to a carbon atom or heteroatom of a corresponding unsubstituted compound or functional group is replaced by a substituent (e.g., $R^S$), as in "perfluorinated alkyl" means every hydrogen in an alkyl group is replaced by a fluorine atom. The term "polysubstitution" means that at least two, but fewer than all, hydrogen atoms bonded to carbon atoms or heteroatoms of a corresponding unsubstituted compound or functional group are replaced by a substituent. The term "—H" means a hydrogen or hydrogen radical that is covalently bonded to another atom. "Hydrogen" and "—H" are interchangeable, and unless clearly specified have identical meanings.

The term "$(C_1-C_{50})$hydrocarbyl" means a hydrocarbon radical of from 1 to 50 carbon atoms and the term "$(C_1-C_{50})$hydrocarbylene" means a hydrocarbon diradical of from 1 to 50 carbon atoms, in which each hydrocarbon radical and each hydrocarbon diradical is aromatic or non-aromatic, saturated or unsaturated, straight chain or branched chain, cyclic (having three carbons or more, and including monocyclic and polycyclic, fused and non-fused polycyclic, and bicyclic) or acyclic, and substituted by one or more $R^S$ or unsubstituted.

In this disclosure, a $(C_1-C_{50})$hydrocarbyl may be an unsubstituted or substituted $(C_1-C_{50})$alkyl, $(C_3-C_{50})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene (such as benzyl ($-CH_2-C_6H_5$)).

The terms "$(C_1-C_{50})$alkyl" and "$(C_1-C_{18})$alkyl" mean a saturated straight or branched hydrocarbon radical of from 1 to 50 carbon atoms and a saturated straight or branched hydrocarbon radical of from 1 to 18 carbon atoms, respectively, that is unsubstituted or substituted by one or more $R^S$. Examples of unsubstituted $(C_1-C_{50})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 2,2-dimethylpropyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and $[C_{45}]$alkyl. The term "$[C_{45}]$alkyl" means there is a maximum of 45 carbon atoms in the radical, including substituents, and is, for example, a $(C_{27}-C_{40})$alkyl substituted by one $R^S$, which is a $(C_1-C_5)$alkyl, respectively. Each $(C_1-C_5)$alkyl may be methyl, trifluoromethyl, ethyl, 1-propyl, 1-methylethyl, 2,2-dimethylpropyl; or 1,1-dimethylethyl.

The term "$(C_6-C_{50})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms. A monocyclic aromatic hydrocarbon radical includes one aromatic ring; a bicyclic aromatic hydrocarbon radical has two rings; and a tricyclic aromatic hydrocarbon radical has three rings. When the bicyclic or tricyclic aromatic hydrocarbon radical is present, at least one of the rings of the radical is aromatic. The other ring or rings of the aromatic radical may be independently fused or non-fused and aromatic or non-aromatic. Examples of unsubstituted $(C_6-C_{50})$aryl include: unsubstituted $(C_6-C_{20})$aryl, unsubstituted $(C_6-C_{18})$aryl; 2-$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrenyl. Examples of substituted $(C_6-C_{40})$aryl include: substituted $(C_1-C_{20})$aryl; substituted $(C_6-C_{18})$aryl; 2,4-bis[$(C_{20})$alkyl]-phenyl; 3,5-bis[$(C_{20})$alkyl]-phenyl; polyfluorophenyl; pentafluorophenyl; and fluoren-9-one-1-yl.

The term "$(C_3-C_{50})$cycloalkyl" means a saturated cyclic hydrocarbon radical of from 3 to 50 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{50})$hydrocarbylene include unsubstituted or substituted $(C_6-C_{50})$arylene, $(C_3-C_{50})$cycloalkylene, and $(C_1-C_{50})$alkylene (e.g., $(C_1-C_{20})$alkylene). The diradicals may be on the same carbon atom (e.g., —CH$_2$—) or on adjacent carbon atoms (i.e., 1,2-diradicals), or are spaced apart by one, two, or more than two intervening carbon atoms (e.g., 1,3-diradicals, 1,4-diradicals, etc.). Some diradicals include 1,2-, 1,3-, 1,4-, or an α,ω-diradical, and others a 1,2-diradical. The α,ω-diradical is a diradical that has maximum carbon backbone spacing between the radical carbons. Some examples of $(C_2-C_{20})$alkylene α,ω-diradicals include ethan-1,2-diyl (i.e., —CH$_2$CH$_2$—), propan-1,3-diyl (i.e., —CH$_2$CH$_2$CH$_2$—), 2-methylpropan-1,3-diyl (i.e. —CH$_2$CH(CH$_3$)CH$_2$—). Some examples of $(C_6-C_{50})$arylene α,ω-diradicals include phenyl-1,4-diyl, napthalen-2,6-diyl, or napthalen-3,7-diyl.

The term "$(C_1-C_{50})$alkylene" means a saturated straight chain or branched chain diradical (i.e., the radicals are not on ring atoms) of from 1 to 50 carbon atoms that is unsubstituted or substituted by one or more $R^S$. Examples of unsubstituted $(C_1-C_{50})$alkylene are unsubstituted $(C_1-C_{20})$alkylene, including unsubstituted —CH$_2$CH$_2$—, —(CH$_2$)$_3$—, —(CH$_2$)$_4$—, —(CH$_2$)$_5$—, —(CH$_2$)$_6$—, —(CH$_2$)$_7$—, —(CH$_2$)$_8$—, —CH$_2$C*HCH$_3$, and —(CH$_2$)$_4$C*(H)(CH$_3$)—, in which "C*" denotes a carbon atom from which a hydrogen atom is removed to form a secondary or tertiary alkyl radical. Examples of substituted $(C_1-C_{50})$alkylene are substituted $(C_1-C_{20})$alkylene, —CF$_2$—, —C(O)—, and —(CH$_2$)$_{14}$C(CH$_3$)$_2$(CH$_2$)$_5$— (i.e., a 6,6-dimethyl substituted 1,20-eicosylene). Since as mentioned previously two $R^S$ may be taken together to form a $(C_1-C_{18})$alkylene, examples of substituted $(C_1-C_{50})$alkylene also include 1,2-bis(methylene)cyclopentane, 1,2-bis(methylene)cyclohexane, 2,3-bis(methylene)-7,7-dimethyl-bicyclo[2.2.1]heptane, and 2,3-bis(methylene)bicyclo[2.2.2]octane.

The term "$(C_3-C_{50})$cycloalkylene" means a cyclic diradical (i.e., the radicals are on ring atoms) of from 3 to 50 carbon atoms that is unsubstituted or substituted by one or more $R^S$.

The term "heteroatom," refers to an atom other than hydrogen or carbon. Examples of groups containing one or more than one heteroatom include —O—, —S—, —S(O)—, —S(O)$_2$—, —Si(R$^C$)$_2$—, —P(R$^P$)—, —P(R$^P$)$_2$, —N(R$^N$)—, —N(R$^N$)$_2$—N=C(R$^C$)$_2$, —N=C(NR$_2^N$)(R$^C$), —Ge(R$^C$)$_2$—, or —Si(R$^C$)$_3$, where each R$^C$ and each R$^P$ is unsubstituted $(C_1-C_{18})$hydrocarbyl or —H, and where each R$^N$ is unsubstituted $(C_1-C_{18})$hydrocarbyl. The term "heterohydrocarbon" refers to a molecule or molecular framework in which one or more carbon atoms of a hydrocarbon are replaced with a heteroatom. The term "$(C_1-C_{50})$heterohydrocarbyl" means a heterohydrocarbon radical of from 1 to 50 carbon atoms, and the term "$(C_1-C_{50})$heterohydrocarbylene" means a heterohydrocarbon diradical of from 1 to 50 carbon atoms. The heterohydrocarbon of the $(C_1-C_{50})$heterohydrocarbyl or the $(C_1-C_{50})$heterohydrocarbylene has one or more heteroatoms. The radical of the heterohydrocarbyl may be on a carbon atom or a heteroatom. The two radicals of the heterohydrocarbylene may be on a single carbon atom or on a single heteroatom. Additionally, one of the two radicals of the diradical may be on a carbon atom and the other radical may be on a different carbon atom; one of the two radicals may be on a carbon atom and the other on a heteroatom; or one of the two radicals may be on a heteroatom and the other radical on a different heteroatom. Each $(C_1-C_{50})$heterohydrocarbyl and $(C_1-C_{50})$heterohydrocarbylene may be unsubstituted or substituted (by one or more $R^S$), aromatic or non-aromatic, saturated or unsaturated, straight chain or branched chain, cyclic (including mono- and poly-cyclic, fused and non-fused polycyclic), or acyclic.

The $(C_1-C_{50})$heterohydrocarbyl may be unsubstituted or substituted. Non-limiting examples of the $(C_1-C_{50})$heterohydrocarbyl include $(C_1-C_{50})$heteroalkyl, $(C_1-C_{50})$hydrocarbyl-O—, $(C_1-C_{50})$hydrocarbyl-S—, $(C_1-C_{50})$hydrocarbyl-S(O)—, $(C_1-C_{50})$hydrocarbyl-S(O)$_2$—, $(C_1-C_{50})$hydrocarbyl-Si(R$^C$)$_2$—, $(C_1-C_{50})$hydrocarbyl-N(R$^N$)—, $(C_1-C_{50})$hydrocarbyl-P(R$^P$)—, $(C_2-C_{50})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$heteroalkylene, $(C_1-C_{50})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene. Additional examples include, but are not limited to —Si(R$^C$)$_{3-Q}$(OR$^C$)$_Q$, —Ge(R$^C$)$_{3-Q}$(OR$^C$)$_Q$, —P(R$^C$)$_{2-W}$(OR$^C$)$_W$, —P(O)(R$^C$)$_{2-W}$(OR$^C$)$_W$, —N(R$^C$)$_2$, —NH(R$^C$)$_2$, —OR$^C$, —SR$^C$, —NO$_2$, —CN, —CF$_3$, —OCF$_3$, —S(O)R$^C$, —S(O)$_2$R$^C$, —OS(O)$_2$R$^C$, N=C(R$^C$)$_2$, N=P(R$^C$)$_3$, —OC(O)R$^C$, —C(O)OR$^C$, —N(R$^C$)C(O)R$^C$, and —C(O)N(R$^C$)$_2$.

The term "$(C_4-C_{50})$heteroaryl" means an unsubstituted or substituted (by one or more $R^S$) mono-, bi-, or tricyclic heteroaromatic hydrocarbon radical of from 4 to 50 total carbon atoms and from 1 to 10 heteroatoms. A monocyclic heteroaromatic hydrocarbon radical includes one heteroaromatic ring; a bicyclic heteroaromatic hydrocarbon radical has two rings; and a tricyclic heteroaromatic hydrocarbon radical has three rings. When the bicyclic or tricyclic heteroaromatic hydrocarbon radical is present, at least one of the rings in the radical is heteroaromatic. The other ring or rings of the heteroaromatic radical may be independently fused or non-fused and aromatic or non-aromatic. Other heteroaryl groups (e.g., $(C_x-C_y)$heteroaryl generally, such as $(C_4-C_{12})$heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered ring or a 6-membered ring. The 5-membered ring has 5 minus h carbon atoms, wherein h is the number of heteroatoms and may be 1, 2, 3, or 4; and each heteroatom may be O, S, N, or P. Examples of 5-membered ring heteroaromatic hydrocarbon radicals include pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 6 minus h carbon atoms, wherein h is the number of heteroatoms and may be 1, 2 or 3 and the heteroatoms may be N or P. Examples of 6-membered ring heteroaromatic hydrocarbon radicals include pyridine-2-yl; pyrimidin-2-yl; pyrazin-2-yl; 1,3,5-triazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazol-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,6,6-ring system is acrydin-9-yl.

The term "$(C_1-C_{50})$heteroalkyl" means a saturated straight or branched chain radicals containing one to fifty carbon atoms, or fewer carbon atoms and one or more of the heteroatoms. The term "$(C_1-C_{50})$heteroalkylene" means a saturated straight or branched chain diradical containing from 1 to 50 carbon atoms and one or more than one heteroatom. The heteroatoms of the heteroalkyls or the heteroalkylenes may include $Si(R^C)_3$, $Ge(R^C)_3$, $Si(R^C)_2$, $Ge(R^C)_2$, $P(R^P)_2$, $P(R^P)$, $N(R^N)_2$, $N(R^N)$, N, O, $OR^C$, S, $SR^C$, S(O), and $S(O)_2$, wherein each of the heteroalkyl and heteroalkylene groups are unsubstituted or are substituted by one or more $R^S$.

Examples of unsubstituted $(C_2-C_{40})$heterocycloalkyl include unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means the anionic form of the halogen atom: fluoride ($F^-$), chloride ($Cl^-$), bromide ($Br^-$), or iodide ($I^-$).

The term "saturated" means lacking carbon-carbon double bonds, carbon-carbon triple bonds, and (in heteroatom-containing groups) carbon-nitrogen, carbon-phosphorus, nitrogen-nitrogen, nitrogen-phosphorus, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, or (in heteroatom-containing groups) one or more carbon-nitrogen, carbon-phosphorus, nitrogen-nitrogen, nitrogen-phosphorus, or carbon-silicon double bonds, not including double bonds that may be present in substituents $R^S$, if any, or in (hetero) aromatic rings, if any.

Embodiments of this disclosure include catalysts systems. The catalyst system includes a procatalyst having a structure according to formula (I):

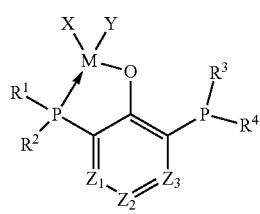

(I)

In formula (I), M is nickel(II) or palladium(II); X is a ligand chosen from $(C_1-C_{40})$hydrocarbyl, $(C_1-C_{40})$heterohydrocarbyl, —$CH_2Si(R^C)_{3-Q}(OR^C)_Q$, —$Si(R^C)_{3-Q}(OR^C)_Q$, —$OSi(R^C)_{3-Q}(OR^C)_Q$, —$Ge(R^C)_{3-Q}(OR^C)_Q$, —$P(R^C)_{2-W}(OR^C)_W$, —$P(O)(R^C)_{2-W}(OR^C)_W$, —$N(R^C)_2$, —$NH(R^C)$, —$N(Si(R^C)_3)_2$, —$NR^CSi(R^C)_3$, —$NHSi(R^C)_3$, —$OR^C$, —$SR^C$, —$NO_2$, —CN, —$CF_3$, —$OCF_3$, —$S(O)R^C$, —$S(O)_2R^C$, —$OS(O)_2R^C$, $N=C(R^C)_2$, $N=CH(R^C)$, $N=CH_2$, $N=P(R^C)_3$, —$OC(O)R^C$, —$C(O)OR^C$, —$N(R^C)$ $C(O)R^C$, —$N(R^C)C(O)H$, —$NHC(O)R^C$, —$C(O)N(R^C)_2$, —$C(O)NHR^C$, —$C(O)NH_2$, a halogen, or a hydrogen, wherein each $R^C$ is independently a substituted or unsubstituted $(C_1-C_{30})$hydrocarbyl, or a substituted or unsubstituted $(C_1-C_{30})$heterohydrocarbyl, in which subscript Q is 0, 1, 2 or 3 and subscript W is 0, 1 or 2. Each $R^C$ is chosen from $(C_1-C_{18})$hydrocarbyl. Each Y is a Lewis base, wherein X and Y are optionally linked.

In formula (I), $Z_1$, $Z_2$, $Z_3$ independently are $C(R^Z)$ or nitrogen, wherein each $R^Z$ is independently hydrogen, substituted $(C_1-C_{30})$hydrocarbyl, substituted $(C_1-C_{30})$heterohydrocarbyl, unsubstituted $(C_1-C_{30})$hydrocarbyl, unsubstituted $(C_1-C_{30})$heterohydrocarbyl, —$CH_2Si(R^C)_{3-Q}(OR^C)_Q$, —$Si(R^C)_{3-Q}$, —$Si(R^C)_340R^C)_Q$, —$OSi(OR^C)_Q$, —$Ge(R^C)_{3-Q}(OR^C)_Q$, —$P(R^C)_{2-W}(OR^C)_W$, —$P(O)(R^C)_{2-W}(OR^C)_W$, —$N(R^C)_2$, —$NH(R^C)$, —$N(Si(R^C)_3)_2$, —$NR^CSi(R^C)_3$, —$NHSi(R^C)_3$, —$OR^C$, —$SR^C$, —$NO_2$, —CN, —$CF_3$, —$OCF_3$, —$S(O)R^C$, —$S(O)_2R^C$, —$OS(O)_2R^C$, $N=C(R^C)_2$, $N=CH(R^C)$, —$N=CH_2$, —$N=P(R^C)_3$, —$OC(O)R^C$, —$C(O)OR^C$, —$N(R^C)C(O)R^C$, —$N(R^C)C(O)H$, —$NHC(O)R^C$, —$C(O)N(R^C)_2$, —$C(O)NHR^C$, —$C(O)NH_2$, a halogen, or a hydrogen; provided that at least one of $Z_1$, $Z_2$, and $Z_3$ is $C(R^Z)$. Subscript Q is 0, 1, 2 or 3 and subscript W is 0, 1 or 2. Each $R^C$ is chosen from hydrogen or $(C_1-C_{18})$hydrocarbyl. In some embodiments, each $R^C$ is chosen from hydrogen or $(C_1-C_{18})$alkyl.

In formula (I), $R^1$, $R^2$, $R^3$, and $R^4$ are independently selected from the group consisting of $(C_1-C_{50})$hydrocarbyl and $(C_1-C_{50})$heterohydrocarbyl.

Optionally, in formula (I), when both $Z_1$ and $Z_2$ are $C(R^Z)$, respective groups $R^Z$ are linked to form a ring structure; when both $Z_2$ and $Z_3$ are $C(R^Z)$, respective groups $R^Z$ are linked to form a ring structure; when all of $Z_1$, $Z_2$, and $Z_3$ are $C(R^Z)$, respective groups $R^Z$ are linked to form a multi-ring structure; $R^1$ and $R^2$ are linked to form a ring structure; and $R^3$ and $R^4$ are linked to form a ring structure.

In some embodiments, in the procatalyst of formula (I), $Z_1$ and $Z_2$ are $C(R^Z)$, and respective groups $R^Z$ are linked to form a six-member ring structure. The procatalyst has a structure according to formula (II):

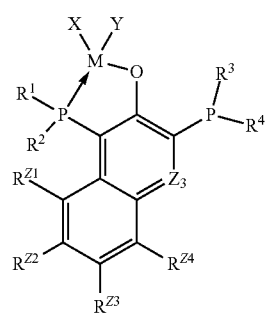

(II)

In formula (II), $R^{Z1}$, $R^{Z2}$, $R^{Z3}$, and $R^{Z4}$ are independently —H, $(C_1-C_{20})$hydrocarbyl, or $(C_1-C_{40})$heterohydrocarbyl, and Ni, $R^1$, $R^2$, $R^3$, $R^4$, $Z_3$, X, and Y are as defined in formula (I).

In some embodiments, in the procatalyst of formula (I), $Z_2$ and $Z_3$ are $C(R^Z)$, and respective groups $R^Z$ are linked to form a six-member ring structure, the procatalyst having a structure according to formula (III):

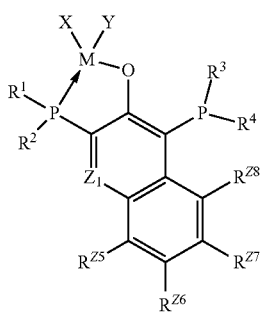

(III)

In formula (III), $R^{Z5}$, $R^{Z6}$, $R^{Z7}$, and $R^{Z8}$ are independently —H, $(C_1-C_{20})$hydrocarbyl, or $(C_1-C_{40})$heterohydrocarbyl, and Ni, $R^1$, $R^2$, $R^3$, $R^4$, $Z_1$, X, and Y are as defined in formula (I).

In various embodiments, $R^1$, $R^2$, $R^3$, and $R^4$ are independently unsubstituted phenyl, substituted phenyl, unsubstituted anthracenyl, substituted anthracenyl. In some embodiments, $R^1$, $R^2$, $R^3$, and $R^4$ are independently 2,6-dimethoxyphenyl, 2,6-diethoxyphenyl, 2,6-diphenoxyphenyl, 2,4,6-triethoxyphenyl, 2,4,6-trimethoxyphenyl, 2-phenylphenyl, 2,6-diisopropoxyphenyl. In other embodiments, $R^1$, $R^2$, $R^3$, and $R^4$ are $(C_1-C_{18})$alkyl. In some embodiments, $R^1$, $R^2$, $R^3$, and $R^4$ are $(C_1-C_{18})$cycloalkyl.

In one or more embodiments, either $R^1$ and $R^2$ are linked to form a 5-membered ring structure and/or $R^3$ and $R^4$ are linked to form a 5-membered ring structure. In other words: in one or more embodiments, $R^1$ and $R^2$ are linked to form a 5-membered ring structure and $R^3$ and $R^4$ are linked to form a 5-membered ring structure; or $R^1$ and $R^2$ are linked to form a 5-membered ring structure and $R^3$ and $R^4$ are not linked to form a 5-membered ring structure; or $R^1$ and $R^2$ are not linked to form a 5-membered ring structure and $R^3$ and $R^4$ are linked to form a 5-membered ring structure.

In some embodiments, $Z_1$ is N. In other embodiments, $Z_2$ is N. In some embodiments, $Z_3$ is N. In one or more embodiments, $Z_1$ and $Z_3$ are N.

In various embodiments, $Z_1$ and $Z_3$ are $C(R^Z)$, wherein each respective $R^Z$ is —H; and $Z_2$ is $C(R^Z)$, wherein the respective $R^Z$ is chosen from —H, a substituted $(C_1-C_{20})$alkyl, unsubstituted $(C_1-C_{20})$alkyl, substituted $(C_6-C_{18})$aryl, unsubstituted $(C_6-C_{18})$aryl, —$OR^N$, —$SR^N$, —$SO_3R^N$, —$SiR^N_3$, halogen, —$N(R^N)_2$, —$P(R^P)_2$, or —$P(O)(R^P)_2$. Each $R^N$ is independently a substituted and unsubstituted $(C_6-C_{18})$aryl or $(C_1-C_{18})$alkyl or halogen. Each $R^P$ is independently substituted $(C_6-C_{18})$aryl, unsubstituted $(C_6-C_{18})$aryl, substituted $(C_6-C_{18})$hetero aryl, unsubstituted $(C_6-C_{18})$hetero aryl, substituted $(C_1-C_{18})$alkyl, unsubstituted $(C_1-C_{18})$alkyl, or —$OR^P$. Optionally two $R^P$ can be linked together to form a ring structure and optionally two $R^N$ can be linked together to form a ring structure.

In one or more embodiments, in the procatalyst of formula (I), $Z_1$ and $Z_3$ are $C(R^Z)$, wherein each respective $R^Z$ is —H; and $Z_2$ is $C(R^Z)$, wherein the respective $R^Z$ is chosen from phenyl, pentafluorophenyl, 3,5-bis(trifluoromethyl)phenyl, —$CF_3$, —$NMe_2$, —$PPh_2$, —$P(O)Ph_2$, —OMe, —$SiMe_3$, —$SiPh_3$, carbazolyl, di-tert-butyl-carbazolyl, anthracenyl, di-tert-butyl-anthracenyl, fluorine, or chlorine.

In one or more embodiments, in the procatalyst of formula (I), $Z_1$ and $Z_3$ are $C(R^Z)$, wherein each respective $R^Z$ is —H; and $Z_2$ is $C(R^Z)$, wherein the respective $R^Z$ is methyl, ethyl, 2-propyl, n-propyl, n-butyl, tert-butyl, 2-methylpropyl, pentyl, hexyl, heptyl, octyl, n-octyl, tert-octyl, nonyl, decyl, undecyl, dodecyl.

In the procatalysts according to formula (I), formula (II), or formula (III), the X bonds with M through a covalent bond, and the Y bonds with M through a dative bond. The procatalyst of formulas (I), (II), and (III) can be overall charge-neutral. In some embodiments, the catalyst system includes a procatalyst of formulas (I), (II), and (III), in which X is independently chosen from substituted $(C_1-C_{30})$hydrocarbyl, unsubstituted $(C_1-C_{30})$hydrocarbyl, substituted $(C_1-C_{30})$heterohydrocarbyl, unsubstituted $(C_1-C_{30})$heterohydrocarbyl, $(C_1-C_{20})$alkyl, $(C_1-C_{20})$heteroalkyl, $(C_6-C_{20})$aryl, $(C_4-C_{20})$heteroaryl, or a halogen. In one or more embodiments, each X is independently —$CH_2Si(CH_3)_3$, methyl, benzyl, phenyl, or chloro. In further embodiments, each X is selected from methyl; ethyl; 1-propyl; 2-propyl; 1-butyl; 2,2-dimethylpropyl; (n-butyl)dimethylsilylmethyl; (n-hexyl)dimethylsilylmethyl; (n-octyl)dimethylsilylmethyl.

In some embodiments, X can be a halogen, unsubstituted $(C_1-C_{20})$hydrocarbyl, unsubstituted $(C_1-C_{20})$hydrocarbyl-C(O)O—, or $R^K R^L N$—, wherein each of $R^K$ and $R^L$ independently is an unsubstituted $(C_1-C_{20})$hydrocarbyl. In some embodiments, each monodentate ligand X is a chlorine atom, $(C_1-C_{10})$hydrocarbyl (e.g., $(C_1-C_6)$alkyl or benzyl), unsubstituted $(C_1-C_{10})$hydrocarbyl-C(O)O—, or $R^K R^L N$—, wherein each of $R^K$ and $R^L$ independently is an unsubstituted $(C_1-C_{10})$hydrocarbyl.

In one or more embodiments, Y is Lewis base. In some embodiments, Y is an organic Lewis base. In various embodiments, the organic Lewis base is $(C_1-C_{30})$heterohydrocarbyl provided that the heteroatom of the heterohydrocarbyl can form a dative bond with M. The organic Lewis base may be sulfoxide, trihydrocarbylphosphine, such as trialkylphosphine, dialkylarylphosphine, alkyldiarylphosphine, or triarylphosphine, trialkyl, triaryl phosphine, olefin or cyclic olefin, substituted or unsubstituted heterocycle, alkyl ester of aliphatic or aromatic carboxylic acid, aliphatic ketone, an aliphatic amine, aliphatic alcohol, alkyl or cycloalkyl ether, or mixtures thereof, each electron donor having 2 to 20 carbon atoms. In various embodiments, the organic Lewis base is selected from alkyl ethers and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. Specific examples of an organic Lewis base include, but are not limited to: methyl formate, ethyl acetate, butyl acetate, ethyl ether, dioxane, di-n-propyl ether, dibutyl ether, ethanol, 1-butanol, ethyl formate, methyl acetate, ethyl anisate, ethylene carbonate, tetrahydropyran, tetrahydrofuran, ethyl propionate, pyridine, substituted pyridine, lutidine, picoline, dimethyl sulfoxide, trimethylphosphine, triphenylphosphine, cyclooctadiene, cyclopentene, ethylene, propylene, tert-butyl ethylene, trimethylamine, 1-methylimidazole, or 1-methylpyrazole. In some embodiments, the Lewis base is pyridine.

In some embodiments, X and Y are covalently linked. Specific examples of an organic Lewis base Y covalently linked together with an X group include, but are not limited to: 4-cycloocten-1-yl, 2-dimethylaminobenzyl, and 2-dimethylaminomethylphenyl.

In some embodiments, any or all of the chemical groups (e.g., X and $R^1$—$R^4$) of the procatalysts of formula (I) may be unsubstituted. In other embodiments, none, any, or all of the chemical groups X and $R^1$—$R^4$ of the metal-ligand complex of formula (I) may be substituted with one or more than one $R^S$. When two or more than two $R^S$ are bonded to a same chemical group of the procatalysts of formula (I), the individual $R^S$ of the chemical group may be bonded to the same carbon atom or heteroatom or to different carbon atoms or heteroatoms. In some embodiments, none, any, or all of the chemical groups X and $R^1$—$R^4$ may be persubstituted with $R^S$. In the chemical groups that are persubstituted with $R^S$, the individual $R^S$ may all be the same or may be independently chosen.

Embodiments of this disclosure include polymerization processes. In some embodiments, the polymerization process includes polymerizing ethylene with one or more olefinic monomers in the presence of a catalyst system under olefin polymerization conditions to form an ethylene-based copolymer, the catalyst system comprising a metal-ligand complex according to formula (I) as described in this disclosure. Olefinic monomers may include, but are not limited to, propylene, 1-butene, 1-hexene, 1-octene, 1-nonene, 1-decene, 1-undecene, 1-dodecene, 4-methyl-1-pentene, styrene, alkyl acrylate, glycidyl acrylate, $CH_2=C(H)(CH_2)_nC(O)(OR)$, $CH_2=C(H)C(O)(OR)$, $CH_2=CHC(O)R$, $CH_2=C(H)$—$OC(O)R$—$CH_2=CH(OR)$, $CH_2=CHSi(R)_{3-T}(OR)^T$, or $CH_2=CHCl$. Each R is chosen from —H, substituted $(C_1-C_{30})$hydrocarbyl, unsubstituted $(C_1-C_{30})$hydrocarbyl, substituted $(C_1-C_{30})$heterohydrocarbyl, or unsubstituted $(C_1-C_{30})$heterohydrocarbyl. Subscript T is 0, 1, 2, or 3. Subscript n is 1 to 10.

In various embodiments of the polymerization processes, the polar comonomer includes alkyl acrylate, glycidyl acrylate, $CH_2=C(H)(CH_2)_nC(O)(OR)$, $CH_2=C(H)C(O)(OR)$, $CH_2=CHC(O)R$, $CH_2=C(H)$—$OC(O)R$, $CH_2=CH(OR)$, $CH_2=CHSi(R)_{3-T}(OR)T$, or $CH_2=CHCl$. Each R is chosen from —H, substituted $(C_1-C_{30})$hydrocarbyl, unsubstituted $(C_1-C_{30})$hydrocarbyl, substituted $(C_1-C_{30})$heterohydrocarbyl, or unsubstituted $(C_1-C_{30})$heterohydrocarbyl. Subscript T is 0, 1, 2, or 3. Subscript n is 1 to 10. In embodiments in which the polar monomer is an alkyl acrylate, the polar ethylene-based copolymer may be de-esterified to form an acrylic acid ethylene-based copolymer.

In some embodiments of the polymerization process, the alkyl acrylate monomer may be, by way of example and not limitation, methyl acrylate, ethyl acrylate, n-butyl acrylate, iso-butyl acrylate, t-butyl acrylate, or combinations thereof. In various embodiments, the alkyl acrylate has an alkyl group with from 1 to 8 carbons. This is designated a $C_2$-$C_8$-alkyl acrylate. In particular embodiments, the alkyl acrylate is methyl acrylate, t-butyl acrylate, or n-butyl acrylate.

In some embodiments of the polymerization process the optional α-olefin monomer may be, by way of example and not limitation, propylene, 1-butene, 1-pentene, 1-hexene, 1-heptene, 1-octene, 1-nonene, 1-decene, 1-undecene, 1-dodecene, 4-methyl-1-pentene, styrene, or combinations thereof.

In illustrative embodiments, the catalyst systems may include a procatalyst according to formula (I) having the structure of the Procatalyst 1 listed below:

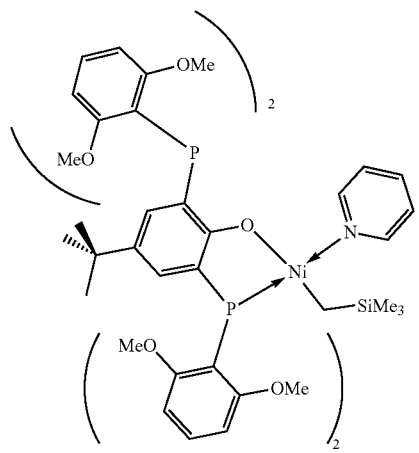

Procatalyst 1

Acid Component

The catalyst system comprising a procatalyst of formula (I) may be rendered catalytically active by removing the Lewis base coordinated to the Ni center. For example, the procatalyst according to a procatalyst of formula (I) may be rendered catalytically active by contacting the complex to, or combining the complex with, a Lewis acid. In some embodiments, the catalysts system may not include an acid component. Suitable acids for use herein include, for example, alkyl/aryl aluminums; polymeric or oligomeric alumoxanes (also known as aluminoxanes); or alkyl zincs. Combinations of one or more of the foregoing acids is also contemplated. The term "alkyl aluminum" means a monoalkyl aluminum dihydride or monoalkyl aluminum dihalide, a dialkyl aluminum hydride or dialkyl aluminum halide, or a trialkylaluminum, or mixtures thereof. Examples of polymeric or oligomeric alumoxanes include methylalumoxane, triisobutylaluminum-modified methylalumoxane, and isobutylalumoxane.

Suitable acids include Group 13 metal compounds containing $(C_1-C_{20})$hydrocarbyl substituents as described herein. In some embodiments, Group 13 metal compounds are tri$((C_1-C_{20})$hydrocarbyl)-substituted-aluminum or tri $((C_1-C_{20})$hydrocarbyl)-boron compounds. In other embodiments, Group 13 metal compounds are tri(hydrocarbyl)-substituted-aluminum, tri$((C_1-C_{20})$hydrocarbyl)-boron compounds, tri$((C_1-C_{18})$aluminum, tri$((C_6-C_{18})$aryl)boron compounds, and halogenated (including perhalogenated, especially fluorinated or perfluorinated) derivatives thereof. In further embodiments, Group 13 metal compounds are tris(fluoro-substituted phenyl)boranes, or tris(pentafluorophenyl)borane.

Combinations of neutral Lewis acids include mixtures comprising a combination of a tri$((C_1-C_4)$aluminum and a halogenated tri$((C_6-C_{18})$aryl)boron compound, especially a tris(pentafluorophenyl)borane. Other embodiments are combinations of such neutral Lewis acid mixtures with a polymeric or oligomeric alumoxane, and combinations of a single neutral Lewis acid, especially tris(pentafluorophenyl) borane with a polymeric or oligomeric alumoxane. Ratios of numbers of moles of (procatalysts):(tris(pentafluorophenyl-borane):(alumoxane are from 1:1:1 to 1:10:30, in other embodiments, from 1:1:1.5 to 1:5:10.

Ethylene/Acrylate Copolymer

In various embodiments, the polymerization process of this disclosure may produce ethylene-based copolymers, in which the polar ethylene-based copolymers contain at least 50 percent by weight (wt. %) of ethylene based on the weight of the polar ethylene-based copolymers. In some embodiments, the polar ethylene-based copolymers are the reaction product of 70 to 99.9 wt. % ethylene units and 0.1 wt. % to 30 wt. % polar comonomer units based on the sum of the ethylene units and the polar comonomer units.

In one or more embodiments, the polymerization process of this disclosure may include ethylene monomers, alkyl acrylate monomers, and optionally one or more α-olefins. In some embodiments of the polymerization process which includes α-olefins, the α-olefins may be incorporated into the produced polymers in amounts of from 0.01 to 45 wt. % based on the weight of the ethylene-based acid copolymer.

In various embodiments, the polymerization process of this disclosure may produce ethylene-based acid copolymer with a molecular weight of from 5,000 g/mol to 1,000,000 g/mol. In some embodiments, the produced polymer has a molecular weight of from 25,000 g/mol to 900,000 g/mol, from 30,000 g/mol to 800,000 g/mol, or from 10,000 g/mol to 300,000 g/mol.

General Procedure for PPR Screening Experiments

Polyolefin catalysis screening was performed in a high-throughput parallel polymerization reactor (PPR) system. The PPR system was comprised of an array of 48-single cell (6×8 matrix) reactors in an inert atmosphere glovebox. Each cell was equipped with a glass insert (reactor tube) with an internal working liquid volume of approximately 5 mL. Each cell had independent controls for pressure and was continuously stirred at 500 Hz. Catalyst, ligand, and metal precursor solutions, and optional activator solutions (if used), unless otherwise noted, were prepared in toluene. Unless otherwise indicated, ligands were metallated with a 1:1 ligand:metal (L:M) ratio by premixing a solution of metal precursor with a solution of the ligand. All liquids (i.e., solvent, t-butyl acrylate, and catalyst solutions and optional activator solutions (if used)) were added via robotic syringes. Gaseous reagents (i.e., ethylene) were added via a gas injection port. Prior to each run, the reactors were heated to 50° C., purged with ethylene, and vented. Tert-butyl acrylate was filtered through a short column of activated alumina prior to use to remove any polymerization inhibitors (e.g., 4-methoxyphenol).

All desired cells were injected with t-butyl acrylate followed with a portion of toluene. The reactors were heated to the run temperature and then pressurized to the appropriate psig with ethylene. Isolated catalyst complexes or in situ metallated ligands and optional activator solutions (if used) were then added to the cells. Each catalyst addition was chased with a small amount of toluene so that after the final addition, a total reaction volume of 5 mL was reached. Upon addition of the catalyst, the PPR software began monitoring the pressure of each cell. The desired pressure (within approximately 2-6 psig) was maintained by the supplemental addition of ethylene gas by opening the valve at the set point minus 1 psi and closing it when the pressure reached 2 psi higher. All drops in pressure were cumulatively recorded as "Uptake" or "Conversion" of the ethylene for the duration of the run or until the uptake or conversion requested value was reached, whichever occurred first. Each reaction was then quenched by addition of 1% oxygen in nitrogen for 30 seconds at 40 psi higher than the reactor pressure. The shorter the "Quench Time" (the elapsed time from when the catalyst is added until the reaction is quenched), the more active the catalyst. In order to prevent the formation of too much polymer in any given cell, the reaction was quenched upon reaching a predetermined uptake level of 80 psig. After all the reactors were quenched they were allowed to cool to about 60° C. They were then vented and the reactor tubes were removed and placed in a centrifugal evaporator. The polymer samples were then dried in a centrifugal evaporator at 60° C. for 12 hours, weighed to determine polymer yield and submitted for IR (t-butyl acrylate incorporation), GPC (molecular weight, polydispersity (PDI)), and DSC (melting point) analysis.

General Procedure for Batch Reactor Experiments

Under a nitrogen atmosphere, 640 g of dry toluene was introduced into a 2-L stainless steel Parr reactor equipped with a rotating stir shaft. Prior to introduction into the reactor, tert-butyl acrylate was filtered through a short column of activated alumina in order to remove any polymerization inhibitors (e.g., 4-methoxyphenol). Tert-butyl acrylate was added in neat form to the reactor by means of a nitrogen-pressurized shot tank (see Table 2 for amounts). The shot tank was rinsed twice with toluene and the rinses were also transferred to the reactor. The reactor was heated to the desired temperature and pressure, and then a toluene solution of the catalyst was added to the reactor by means of a nitrogen-pressurized shot tank. The shot tank was rinsed twice with toluene and the rinses were also transferred to the reactor. Ethylene was fed continuously to the reactor in order to maintain a pressure of 400 psi. The ethylene feed was stopped after a desired uptake of ethylene was achieved, or in other cases, after a set reaction time. The reactor contents were then dumped into a lidded dump pot containing Irganox as a quench agent. The contents of the dump pot were placed in open, stainless steel trays in a fume hood, where the volatiles were allowed to evaporate for 2 days. The trays were then transferred to a vacuum oven for further drying. Polymer samples were scraped out of the trays, weighed, and submitted for further analyses.

GPC Procedure

High temperature GPC analysis was performed using a Dow Robot Assisted Delivery (RAD) system equipped with a Polymer Char infrared detector (IRS) and Agilent PLgel Mixed A columns. Decane (10 µL) was added to each sample for use as an internal flow marker. Samples were first diluted in 1,2,4-trichlorobenzene (TCB) stabilized with 300 ppm of butylated hydroxytoluene (BHT) at a concentration of 10 mg/mL and dissolved by stirring at 160° C. for 120 minutes. Prior to injection the samples are further diluted with TCB stabilized with BHT to a concentration of 3 mg/mL. Samples (250 µL) are eluted through one PL-gel 20 µm (50 mm×7.5 mm) guard column followed by two PL-gel 20 µm (300 mm×7.5 mm) Mixed-A columns maintained at 160° C. with TCB stabilized with BHT at a flowrate of 1.0 mL/min. The total run time was 24 minutes. To calibrate for molecular weight (MW), Agilent EasiCal polystyrene standards (PS-1 and PS-2) were diluted with 1.5 mL of TCB stabilized with BHT and dissolved by stirring at 160° C. for 15 minutes. These standards are analyzed to create a $3^{rd}$-order MW calibration curve. Molecular weight units are converted from polystyrene (PS) units to polyethylene (PE) units using a daily Q-factor calculated to be around 0.4 using the average of 5 Dowlex 2045 reference samples.

FT-IR Procedure

The 10 mg/mL samples prepared for GPC analysis are also utilized to quantify t-butyl acrylate (tBA) incorporation by Fourier transform infrared spectroscopy (FTIR). A Dow robotic preparation station heated and stirred the samples at 160° C. for 60 minutes then deposited 130 µL portions into stainless wells promoted on a silicon wafer. The TCB was evaporated off at 160° C. under nitrogen purge. IR spectra were collected using a *Nexus* 6700 FT-IR equipped with a DTGS KBr detector from 4000-400 cm$^{-1}$ utilizing 128 scans with a resolution of 4 cm$^{-1}$. Ratio of tBA (C=O:1762-1704 cm$^{-1}$) to ethylene (CH$_2$: 736-709 cm$^{-1}$) peak areas were calculated and fitted to a linear calibration curve to determine total tBA.

DSC Procedure

Melt temperature (Tm), glass transition temperature (Tg), crystallization temperature (Tc) and Heat of Melt were measured on solid polymer samples by differential scanning calorimetry (DSC Q2000, TA Instruments, Inc.) using a Heat-Cool-Heat temperature profile. Open-pan DSC samples of 3-6 mg of polymer are subjected to the temperature profile below and traces were analyzed individually using TA Universal Analysis software or TA Instruments TRIOS software.

Equilibrate at 175.00° C.
Isothermal for 3 minutes
Ramp 30.00° C./min to 0.00° C.
Ramp 10.00° C./min to 175.00° C.

EXAMPLES

Examples 1 to 2 are synthetic procedures for ligand intermediates, ligands, and isolated procatalysts. In Examples 3 and 4, the results of the polymerization reactions of Procatalyst 1 are tabulated and discussed. One or more features of the present disclosure are illustrated in view of the examples as follows:

Example 1—Synthesis of 2,6-bis(bis(2',6'-dimethoxyphenyl)phosphino)-4-tert-butylphenol (POP—H)

A Schlenk flask fitted with a screw-in Teflon stopper was charged with a solution of 1,3-dibromo-5-(tert-butyl)-2-(methoxymethoxy)benzene (3.52 g, 10.0 mmol) in THF (40 mL) and cooled to −78° C. under nitrogen. A hexane solution of n-butyllithium (4 mL, 2.5 M, 10.0 mmol) was added dropwise via syringe. After stirring for an additional 30 min, a solution of bis(2,6-dimethoxyphenyl)phosphine chloride (3.41 g, 10.0 mmol) in THF (20 mL) was added dropwise via cannula. After complete addition, the reaction was allowed to warm up to room temperature and stirred for an additional 3 h, yielding a yellow solution. Then the reaction mixture was cooled to −78° C. and a hexane solution of n-butyllithium (4 mL, 2.5 M, 10.0 mmol) was added dropwise via syringe. After stirring for an additional 30 min, a solution of bis(2,6-dimethoxyphenyl)phosphine chloride (3.41 g, 10.0 mmol) in THF (20 mL) was added dropwise via cannula. After complete addition, the reaction was allowed to warm up to room temperature and stirred for an additional 3 h, yielding a bright orange solution. The volatiles were then removed under vacuum. To the pale yellow-white residue CH$_2$Cl$_2$ (20 mL), degassed MeOH (10 mL) and concentrated aqueous HCl (5 mL) was added. The resulting mixture was stirred for 8 h under room temperature and then volatiles were once more removed under vacuum. In a N$_2$-filled glovebox (no exclusion of water), the resulting orange residue was taken up in CH$_2$Cl$_2$ (40 mL) and washed with saturated aqueous solutions of K$_2$CO$_3$ (10 mL×3) and NH$_4$Cl (10 mL×3). The volatiles were removed under reduced pressure. In a glovebox (exclusion of water and oxygen), the resulting pale-yellow solid was dissolved in ether and filtered through Celite. The volatile materials were removed once more under vacuum and the resulting mixture was washed with hexanes (10 mL) and the solid was collected via vacuum filtration, yielding 2,6-bis(bis(2',6'-dimethoxyphenyl)phosphino)-4-tert-butylphenol (POP—H) (1.68 g, 2.2 mmol, 22%) as a white powder.

$^1$H NMR (400 MHz, C$_6$D$_6$): δ7.56-7.54 (d, 2H, ArH), 7.50 (s, 1H, OH), 7.03-6.99 (t, 4H, ArH), 6.26-6.23 (dd, 8H, ArH), 3.13 (s, 24H, OCH$_3$), 1.17 (s, 9H, C(CH$_3$)$_3$); $^{13}$C NMR (400 MHz, C$_6$D$_6$): 162.52 (d, aryl-C), 159.09 (t, Ar—C), 138.94 (t, Ar—C), 130.83 (d, Ar—C), 128.92 (s, Ar—C), 121.97 (d, Ar—C), 115.16 (d, Ar—C), 104.20 (s, Ar—C), 55.12 (s, OCH$_3$), 33.95 (s, C(CH$_3$)$_3$), 31.65 (s, C(CH$_3$)$_3$); $^{31}$P NMR (400 MHz, C$_6$D$_6$): −55.61 (s).

Example 2—Synthesis POP—Ni(pyridine)(CH$_2$SiMe$_3$) complex, procatalyst 1

Step 1—Preparation of (pyridine)$_2$Ni(CH$_2$Si(CH$_3$)$_3$)$_2$

In a nitrogen-filled glovebox, a reaction jar was charged with tetrakis(pyridine)nickel dichloride (1.78 g, 3.99 mmol, 1 equiv.), diethyl ether (40 mL), and pyridine (0.51 mL). The jar was cooled in a −35° C. freezer for 3 days. The jar was removed from the freezer and a 1.0 M solution of trimethylsilylmethylmagnesium chloride in Et$_{2O}$ (8.0 mL, 8.0 mmol, 2 equiv.) was added slowly. During the addition, the blue solid changed to turquoise and finally beige. The reaction mixture was stirred at room temperature for 15 min, after which the color of the suspension was observed to be brown. The solution was concentrated in vacuo over a period of 15 min to afford a thick brown slurry. The brown slurry was triturated with pentane (20 mL) and concentrated in vacuo. A solution of pentane (120 mL) with pyridine (1.2 mL) was prepared. The brown solid was triturated with the pentane/pyridine solution (40 mL) and filtered through a pad of Celite (this process was repeated for a total of three times). The combined filtrates were concentrated in vacuo to a volume of 40 mL. The red solution was placed in a −35° C. freezer for 20 h, resulting in the precipitation of a crystalline solid. The suspension was filtered, washed with cold (−30° C.) pentane (10 mL), and dried in vacuo to afford a dark red crystalline solid (0.770 g, 49% yield).

Step 2—Preparation of POP—Ni(pyridine)(CH$_2$SiMe$_3$) complex—Procatalyst 1

Inside a glove box, a 20-mL vial was charged with (pyridine)$_2$Ni(CH$_2$Si(CH$_3$)$_3$)$_2$ (22 mg, 0.0593 mmol) and benzene (2 mL). To the solution was added a solution of 2,6-bis(bis(2',6'-dimethoxyphenyl)phosphino)-4-tert-butylphenol (POP—H, 42.83 mg, 0.0563 mmol) in benzene (4 mL). One drop of pyridine was added to the mixture and the resulted solution was stirred for 2 h in the glove box, forming a red-brown solution. All volatiles were removed under vacuum and the residue was extracted with hexanes, filtered, and dried in vacuo to provide the complex as a deep yellow solid (44 mg, 76%).

$^1$H NMR (400 MHz, C$_6$D$_6$): δ8.94-8.92 (m, 2H, ArH), (s, 1H, OH), 7.47-7.43 (m, 1H, ArH), 7.08-7.04 (t, 2H, ArH), 7.04-7.00 (t, 2H, ArH), 6.95-6.92 (m, 1H, ArH), 6.83-6.79 (m, 1H, ArH), 6.47-6.43 (m, 2H, ArH), 6.34-6.32 (dd, 4H, ArH), 6.29-6.26 (dd, 4H, ArH), 3.36 (s, 12H, OCH$_3$), 3.28 (s, 12H, OCH$_3$), 1.13 (s, 9H, C(CH$_3$)$_3$), 0.12 (s, 9H, Si(CH$_3$)$_3$), −0.71-0.74 (s, 2H, NiCH$_2$Si; $^{13}$C NMR (400 MHz, C$_6$D$_6$): 163.54 (d, Ar—C), 163.42 (d, Ar—C) 151.15 (s, Ar—C), 132.93 (d, Ar—C), 129.84 (m, Ar—C), 129.76 (s, Ar—C), 128.78 (d, Ar—C), 128.37 (s, Ar—C), 128.19 (s,

Ar—C), 125.05 (t, Ar—C), 122.69 (d, Ar—C), 118.20 (d, Ar—C), 112.32 (s, Ar—C), 111.86 (s, Ar—C), 104.67 (s, Ar—C), 104.45 (d, Ar—C), 55.66 (d, OCH$_3$), 55.13 (d, OCH$_3$), 33.70 (s, C(CH$_3$)$_3$), 31.98 (s, C(CH$_3$)$_3$), 2.15 (s, Si(CH$_3$)$_3$), −18.25 (d, NiCH$_2$Si); $^{31}$P NMR (400 MHz, C$_6$D$_6$): −5.28-5.35 (d), −52.06-52.13 (d).

Example 3—Polymerization Reactions in Parallel Pressure Reactor

Catalyst activity (in terms of quench time and polymer yield) and resulting polymer characteristics were assessed for Procatalyst 1. The polymerization reactions were carried out in a parallel pressure reactor (PPR), as previously described.

For these experiments, ligands were metallated in situ by combining a 2 mM solution of the ligand in toluene with a 2 mM solution of bis(trimethylsilylmethyl)bis(pyridine)nickel(II) in toluene to form a yellow solution. The solution was stirred at room temperature for 30 minutes prior to delivery to the dry box containing the PPR reactor. Copolymerization experiments were run at 400 psi ethylene pressure with 0.25 μmol catalyst loading. Reactor temperature and tert-butyl acrylate loading were varied as shown in Table 1. Each entry in Table 1 represents the average of at least 2 replicate runs.

TABLE 1

Performance of Procatalyst 1 in a PPR

| Run | Catalyst | Acrylate Loading (μmol) | Reactor Temp (° C.) | Activity (kg/mol · h) | Mw | PDI | Tm (° C.) | % Mol t-BA | Wt % t-BA |
|---|---|---|---|---|---|---|---|---|---|
| 1 | Procat. 1 | 250 | 70 | 317 | 93,960 | 2.26 | 107.6 | 2.52 | 10.58 |
| 2 | Procat. 1 | 250 | 90 | 585 | 59,289 | 2.23 | 110.9 | 2.17 | 9.20 |
| 3 | Procat. 1 | 500 | 90 | 240 | 41,679 | 2.29 | 95.0 | 4.95 | 19.2 |
| 4 | Procat. 1 | 750 | 90 | 118 | 28,929 | 2.31 | 82.4 | 8.17 | 28.9 |
| 5 | Procat. 1 | 750 | 100 | 113 | 22,673 | 2.23 | 82.1 | 7.78 | 27.8 |
| 6 | Procat. 1 | 1000 | 100 | 82 | 19,054 | 2.21 | 68.4 | 11.95 | 38.3 |

At various reactor temperatures and acrylate loading amounts, the catalyst systems including Procatalyst 1 produced polymers containing various amounts of t-butyl acrylate (t-BA).

Example 4—Batch Reactor Polymerization Reaction

In this experiment the procatalyst was introduced to the reactor as a toluene solution of the isolated metal complex (see Example 2). The copolymerization experiment was run at 400 psi ethylene pressure with 59.2 μmol catalyst loading. Reactor temperature and t-butyl acrylate loading was as shown in Table 2.

TABLE 2

Procatalyst 1 in a 2-L batch reactor

| Catalyst | Acrylate Loading (mmol) | Reactor Temp (° C.) | Activity (kg/mol · h) | Mw | PDI | Tm (° C.) | % Mol t-BA | Wt % t-BA |
|---|---|---|---|---|---|---|---|---|
| Procat. 1 | 74 | 90 | 460 | 44,860 | 2.38 | 106.2 | 3.72 | 15.0 |

The invention claimed is:

1. A catalyst system comprising a procatalyst having a structure according to formula (I):

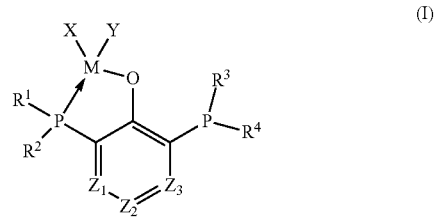

where:
M is nickel (II) or palladium (II);
X is a ligand chosen from (C$_1$-C$_{40}$)hydrocarbyl, (C$_1$-C$_{40}$)heterohydrocarbyl, —CH$_2$Si(R$^C$)$_{3-Q}$(OR$^C$)$_Q$, —Si(R$^C$)$_{3-Q}$(OR$^C$)$_Q$, —OSi(R$^C$)$_{3-Q}$(OR$^C$)$_Q$, —Ge(R$^C$)$_{3-Q}$(OR$^C$)$_Q$, —P(R$^C$)$_{2-W}$(OR$^C$)$_W$, —P(O)(R$^C$)$_{2-W}$(OR$^C$)$_W$, —N(R$^C$)$_2$, —NH(R$^C$), —N(Si(R$^C$)$_3$)$_2$, —NR$^C$Si(R$^C$)$_3$, —NHSi(R$^C$)$_3$, —OR$^C$, —SR$^C$, —NO$_2$, —CN, —CF$_3$, —OCF$_3$, —S(O)R$^C$, —S(O)$_2$R$^C$, —OS(O)$_2$R$^C$, —N═C(R$^C$)$_2$, —N═CH(R$^C$), —N═CH$_2$, —N═P(R$^C$)$_3$, —OC(O)R$^C$, —C(O)OR$^C$, —N(R$^C$)C(O)R$^C$, —N(R$^C$)C(O)H, —NHC(O)R$^C$, —C(O)N(R$^C$)$_2$, —C(O)NHR$^C$, —C(O)NH$_2$, a halogen, or a hydrogen, wherein each R$^C$ is independently a substituted or unsubstituted (C$_1$-C$_{30}$)hydrocarbyl, or a substituted or unsubstituted (C$_1$-C$_{30}$)heterohydrocarbyl, and Q is 0, 1, 2 or 3 and W is 0, 1, or 2;
each Y is a Lewis base, wherein X and Y are optionally linked;
Z$_1$, Z$_2$, Z$_3$ independently are C(R$^Z$) or nitrogen, wherein each R$^Z$ is independently substituted (C$_1$-C$_{30}$)hydrocarbyl, unsubstituted (C$_1$-C$_{30}$)hydrocarbyl, substituted (C$_1$-C$_{30}$)heterohydrocarbyl, unsubstituted (C$_1$-C$_{30}$)heterohydrocarbyl, —CH$_2$Si(R$^C$)$_{3-Q}$(OR$^C$)$_Q$, —Si(R$^C$)$_{3-Q}$(OR$^C$)$_Q$, —OSi(R$^C$)$_{3-Q}$(OR$^C$)$_Q$, —Ge(R$^C$)$_{3-Q}$(OR$^C$)$_Q$, —P(R$^C$)$_{2-W}$(OR$^C$)$_W$, —P(O)(R$^C$)$_{2-W}$(OR$^C$)$_W$, —N $—(R^C)_2$, $—NH(R^C)$, $—N(Si(R^C)_3)_2$, $—NR^CSi(R^C)_3$, $—NHSi(R^C)_3$, $—OR^C$, $—SR^C$, $—NO_2$, $—CN$, $—CF_3$, $—OCF_3$, $—S(O)R^C$, $—S(O)_2R^C$, $—OS(O)_2R^C$, $—N=C(R^C)_2$, $—N=CH(R^C)$, $—N=CH_2$, $—N=P(R^C)_3$, $—OC(O) R^C$, $—C(O) OR^C$, $—N(R^C)C(O) R^C$, $—C(O)N(R^C)_2$, $—N(R^C)C(O)H$, $—NHC(O)R^C$, $—C(O)N(R^C)_2$, $—C(O)NHR^C$, $—C(O)NH_2$, a halogen, or a hydrogen, wherein Q is 0, 1, 2 or 3, W is 0, 1 or 2, and each $R^C$ is independently a substituted or unsubstituted $(C_1-C_{30})$hydrocarbyl, or a substituted or unsubstituted $(C_1-C_{30})$heterohydrocarbyl, or hydrogen; provided that at least one of $Z_1$, $Z_2$, and $Z_3$ is $C(R^Z)$;

$R^1$, $R^2$, $R^3$, and $R^4$ are independently selected from the group consisting of a $(C_1-C_{50})$hydrocarbyl and $(C_1-C_{50})$heterohydrocarbyl;

when both $Z_1$ and $Z_2$ are $C(R^Z)$, optionally respective groups $R^Z$ are linked to form a ring structure;

when both $Z_2$ and $Z_3$ are $C(R^Z)$, optionally respective groups $R^Z$ are linked to form a ring structure;

when all of $Z_1$, $Z_2$, and $Z_3$ are $C(R^Z)$, optionally respective groups $R^Z$ are linked to form a multi-ring structure;

optionally, $R^1$ and $R^2$ are linked to form a ring structure; and optionally, $R^3$ and $R^4$ are linked to form a ring structure.

2. The catalyst system of claim 1, wherein $Z_1$ and $Z_2$ are $C(R^Z)$, and respective groups $R^Z$ are linked to form a six-membered aromatic ring structure, the procatalyst having a structure according to formula (II):

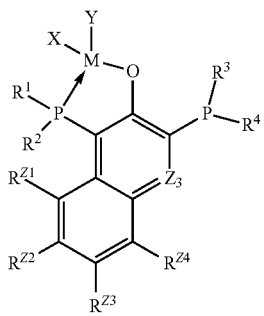

(II)

where:

M, $R^1$, $R^2$, $R^3$, $R^4$, $Z_3$, X, and Y are as defined in formula (I); and $R^{Z1}$, $R^{Z2}$, $R^{Z3}$, and $R^{Z4}$ are independently —H, $(C_1-C_{20})$hydrocarbyl, or $(C_1-C_{40})$heterohydrocarbyl.

3. The catalyst system of claim 1, wherein $Z_2$ and $Z_3$ are $C(R^Z)$, and respective groups $R^Z$ are linked to form a six-membered aromatic ring structure, the procatalyst having a structure according to formula (III):

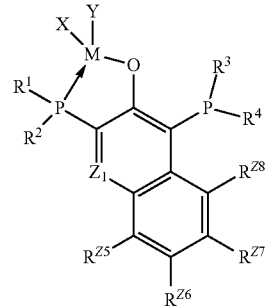

(III)

where:

M, $R^1$, $R^2$, $R^3$, $R^4$, $Z_1$, X, and Y are as defined in formula (I); and $R^{Z5}$, $R^{Z6}$, $R^{Z7}$, and $R^{Z8}$ are independently —H, $(C_1-C_{40})$hydrocarbyl, or $(C_1-C_{40})$heterohydrocarbyl.

4. The catalyst system of claim 1, wherein $R^1$, $R^2$, $R^3$, and $R^4$ are independently a substituted phenyl, unsubstituted phenyl, substituted naphthyl, unsubstituted naphthyl, substituted anthracenyl, or unsubstituted anthracenyl.

5. The catalyst system of claim 1, wherein $R^1$, $R^2$, $R^3$, and $R^4$ are 2,6-dimethoxyphenyl, 2,6-diethoxyphenyl, 2,6-diphenoxyphenyl, 2,4,6-triethoxyphenyl, 2,4,6-trimethoxyphenyl, 2-phenylphenyl, or 2,6-diisopropoxyphenyl.

6. The catalyst system of claim 1, wherein $R^1$, $R^2$, $R^3$, and $R^4$ are $(C_1-C_{18})$alkyl.

7. The catalyst system of claim 1, wherein either $R^1$ and $R^2$ are linked to form a 5-membered ring structure and/or $R^3$ and $R^4$ are linked to form a 5-membered ring structure.

8. The catalyst system of claim 1, wherein $Z_1$ is N.

9. The catalyst system of claim 1, wherein $Z_2$ is N.

10. The catalyst system of claim 1, wherein $Z_3$ is N.

11. The catalyst system of claim 1, wherein $Z_1$ and $Z_3$ are N.

12. The catalyst system of claim 1, wherein $Z_1$ and $Z_3$ are $C(R^Z)$, wherein each respective $R^Z$ is —H; and $Z_2$ is $C(R^Z)$, wherein the respective $R^Z$ is chosen from —H, substituted $(C_1-C_{20})$alkyl, unsubstituted $(C_1-C_{20})$alkyl, substituted $(C^6-C^{18})$aryl, unsubstituted $(C_1-C_{20})$heteroalkyl, substituted $(C^6-C^{18})$heteroaryl, unsubstituted $(C^6-C^{18})$aryl, —$OR^N$, —$SR^N$, —$SO_3R^N$, —$SiR^N_3$, halogen, —$N(R^N)_2$, —$P(R^P)_2$, or —$P(O)(R^P)_2$, wherein each $R^N$ is independently a substituted and unsubstituted $(C^6-C^{18})$aryl or $(C_1-C_{18})$alkyl or halogen, and wherein each $R^P$ is independently a substituted or unsubstituted $(C^6-C^{18})$aryl or a substituted or unsubstituted $(C_1-C_{18})$alkyl, —$OR^P$.

13. The catalyst system of claim 1, wherein $Z_1$ and $Z_3$ are $C(R^Z)$, wherein each respective $R^Z$ is —H; and $Z_2$ is $C(R^Z)$, wherein the respective $R^Z$ is chosen from phenyl, pentafluorophenyl, 3,5-di-trifluoromethylphenyl, —$CF_3$, —$NMe_2$, —$PPh_2$, —$P(O)Ph_2$-OMe, —$SiMe_3$, —$SiPh_3$, carbazolyl, di-tBu-carbazolyl, anthracenyl, di-tBu-anthracenyl, —F, or —Cl.

14. The catalyst system of claim 1, wherein $Z_1$ and $Z_3$ are $C(R^Z)$, wherein each respective $R^Z$ is —H; and $Z_2$ is $C(R^Z)$, wherein the respective $R^Z$ is methyl, ethyl, 2-propyl, n-propyl, n-butyl, tert-butyl, 2-methylpropyl, pentyl, hexyl, heptyl, octyl, n-octyl, tert-octyl, nonyl, decyl, undecyl, dodecyl.

15. The catalyst system of claim 1, wherein X is a substituted or unsubstituted $(C_1-C_{30})$hydrocarbyl, a substituted or unsubstituted $(C_1-C_{30})$heterohydrocarbyl.

16. The catalyst system of claim 1, wherein X is methyl, 2,2-dimethylpropyl, trimethylsilylmethyl, (n-butyl)dimethylsilylmethyl, (n-hexyl)dimethylsilylmethyl, (n-octyl)dimethylsilylmethyl, or benzyl.

17. A polymerization process comprising:
 polymerizing ethylene and optionally olefinic monomers in the presence of a catalyst system under olefin polymerization conditions to form an ethylene-based copolymer, the catalyst system comprising a metal-ligand complex according to formula (I) of claim 1.

18. The polymerization process according to claim 17, wherein the olefinic monomers are chosen from propylene, 1-butene, 1-hexene, 1-octene, 1-nonene, 1-decene, 1-undecene, 1-dodecene, 4-methyl-1-pentene, styrene, alkyl acrylate, glycidyl acrylate, $CH_2=C(H)(CH_2)_nC(O)(OR)$, $CH_2=C(H)C(O)(OR)$, $CH_2=CHC(O)R$, $CH_2-C(H)-OC(O)R$, $CH_2=CH(OR)$, $CH_2=CHSi(R)_{3-T}(OR)_T$, or $CH_2=CHCl$, wherein:
 R is chosen from —H, substituted $(C_1-C_{30})$hydrocarbyl, unsubstituted $(C_1-C_{30})$hydrocarbyl, substituted $(C_1-C_{30})$heterohydrocarbyl, or unsubstituted $(C_1-C_{30})$heterohydrocarbyl;
 T is 0, 1, 2, or 3; and
 n is 1 to 10.

\* \* \* \* \*